(12) United States Patent
Daniel

(10) Patent No.: US 8,800,486 B2
(45) Date of Patent: Aug. 12, 2014

(54) CONTROL SYSTEM AND A METHOD FOR MILKING MEMBERS IN A MILKING PARLOUR

(75) Inventor: Marc Daniel, Hamburg (DE)

(73) Assignee: DeLaval Holding AB, Tumba (SE)

( * ) Notice: Subject to any disclaimer, the term of this patent is extended or adjusted under 35 U.S.C. 154(b) by 8 days.

(21) Appl. No.: 13/879,625

(22) PCT Filed: Oct. 24, 2011

(86) PCT No.: PCT/SE2011/051256
§ 371 (c)(1), (2), (4) Date: Apr. 16, 2013

(87) PCT Pub. No.: WO2012/057677
PCT Pub. Date: May 3, 2012

(65) Prior Publication Data
US 2013/0199449 A1    Aug. 8, 2013

Related U.S. Application Data

(60) Provisional application No. 61/406,627, filed on Oct. 26, 2010.

(30) Foreign Application Priority Data

Oct. 26, 2010 (SE) ................................. 1051110

(51) Int. Cl.
*A01J 5/007* (2006.01)
*A01J 7/02* (2006.01)
*A01K 1/12* (2006.01)

(52) U.S. Cl.
CPC .. *A01J 5/007* (2013.01); *A01J 7/02* (2013.01); *A01K 1/12* (2013.01); *A01J 7/025* (2013.01)
USPC ................... 119/14.02; 119/14.08; 119/14.18

(58) Field of Classification Search
CPC ............. A01J 7/04; A01J 7/025; A01J 5/007; A01J 5/04; A01J 7/022; A01J 5/017; A01J 7/02; A01K 1/12

USPC .......... 119/14.01, 14.02, 14.03, 14.08, 14.14, 119/14.18, 670
See application file for complete search history.

(56) References Cited

U.S. PATENT DOCUMENTS 3,789,798 A    2/1974 Reisgies et al.
4,175,514 A    11/1979 Souza et al.
(Continued)

FOREIGN PATENT DOCUMENTS

DE    10 2006 053 602 A1    5/2008
EP    0 069 560 A1    1/1983
(Continued)

OTHER PUBLICATIONS

International-Type Search Report, dated Apr. 5, 2011, from corresponding PCT application.

(Continued)

*Primary Examiner* — Trinh Nguyen
(74) *Attorney, Agent, or Firm* — Young & Thompson

(57) ABSTRACT

A control system and a method for milking members in a milking parlor having plural milking stalls. The control system includes a local control unit in each milking stall automatically preparing the milking member for a milking operation by setting a vacuum valve in an open position when the milking member is moved from a storage position, and a control unit setting the milking stalls in the milking parlor in a pre-cleaning mode when a milking operation is still in progress in at least one other of the milking stalls. In this case, the local control units prepare the milking members for a cleaning operation instead of a milking operation by maintaining the vacuum valve in a closed position when the milking member is moved from a storage position, until the cleaning operation of the milking member is started.

15 Claims, 3 Drawing Sheets

(56) References Cited

U.S. PATENT DOCUMENTS

| | | |
|---|---|---|
| 6,401,654 B1 | 6/2002 | Hallsten et al. |
| 2005/0211173 A1* | 9/2005 | Fransen et al. ............ 119/14.02 |
| 2006/0156990 A1* | 7/2006 | Bosma et al. ............ 119/14.02 |
| 2007/0215053 A1 | 9/2007 | Duke |
| 2007/0277737 A1 | 12/2007 | Maier et al. |
| 2008/0134978 A1 | 6/2008 | Olmedo |
| 2009/0145362 A1* | 6/2009 | Eriksson et al. ........... 119/14.02 |
| 2009/0320759 A1 | 12/2009 | Odeberg et al. |
| 2010/0132626 A1* | 6/2010 | Torgerson et al. ............ 119/651 |
| 2010/0154900 A1* | 6/2010 | Torgerson et al. ............ 137/511 |
| 2011/0155068 A1 | 6/2011 | Maier et al. |
| 2011/0168097 A1* | 7/2011 | Kristensen et al. ........ 119/14.03 |
| 2012/0012060 A1* | 1/2012 | Eriksson .................... 119/14.18 |
| 2012/0118238 A1* | 5/2012 | Torgerson et al. ......... 119/14.18 |
| 2012/0234355 A1* | 9/2012 | Van Den Berg ................ 134/18 |
| 2012/0273006 A1* | 11/2012 | Hofman et al. ................. 134/18 |
| 2013/0112142 A1* | 5/2013 | Harty et al. ................ 119/14.02 |
| 2013/0213304 A1* | 8/2013 | Bosma et al. ............. 119/14.02 |
| 2013/0228127 A1* | 9/2013 | Fransen et al. ............. 119/14.02 |

FOREIGN PATENT DOCUMENTS

| | | |
|---|---|---|
| EP | 0 824 858 A1 | 2/1998 |
| EP | 1 754 411 A2 | 2/2007 |
| EP | 2 060 169 A1 | 5/2009 |
| SU | 986360 A | 1/1983 |
| SU | 1480788 A1 | 5/1989 |
| SU | 1558349 A1 | 4/1990 |
| WO | 98/31212 A1 | 7/1998 |
| WO | 2006/068589 A1 | 6/2006 |

OTHER PUBLICATIONS

International Search Report, dated Feb. 16, 2012, from corresponding PCT application.

Supplementary International Search Report, dated Feb. 14, 2013, from corresponding PCT application.

* cited by examiner

CONTROL SYSTEM AND A METHOD FOR MILKING MEMBERS IN A MILKING PARLOUR

BACKGROUND OF THE INVENTION AND PRIOR ART

The present invention relates to a control system and a method for milking members in a milking parlour comprising a plurality of milking stalls, wherein each milking stall comprises a milking member to be attached to an animal in the milking stall, a storage device arranged to hold the milking member in a storage position when it is not in use, and a cleaning unit arranged to clean the milking member, wherein the control system comprises a local control unit in each milking stall arranged to automatically prepare the milking member for a milking operation by setting a vacuum valve, which controls application of vacuum pressure to the milking member, in an open position when the milking member is moved from the storage position.

In order to simplify the milking routines, it is known to use a local control unit in each milking stall which automatically senses when the milking member is moved from a storage position by an operator. The local control unit may, for example, comprise a sensor detecting when an operator lifts up the milking member from the storage position. When this happens, the local control unit opens a vacuum valve such that vacuum pressure is applied to the milking member. The milking member is now ready to be attached to the teats of a milking animal. Thanks to the use of the local control unit, the operator does not need to push on a button or the like in each milking stall for applying vacuum pressure to the milking member before it is attached to a milking animal.

When a milking operation is finished, a removing device detaches the milking member from the milking animal and moves it back to the storage position in the milking stall. The removing device may be automatically activated when the milk flow drops below a predetermined minimum. The local control unit closes the vacuum valve, and thereby the application of the vacuum pressure to the milking member, when the milking member is removed to the storage position.

Such local control units in the milking stalls simplifies the routines for operators during a start up phase of a milking operation. However, the routines for operators during a start up phase of a cleaning operation of the milking system are not simplified. Before each milking member is moved from the storage position and put on the cleaning unit, the operators have to push a button or the like in each milking stall in order to set the milking stall in a cleaning mode, for preventing the local control unit from applying vacuum pressure to the milking member when it is moved from the storage position.

SUMMARY OF THE INVENTION

The object of the present invention is to provide a control system and a method simplifying the routines for the operators when the milking members are to be cleaned in a milking parlour comprising a plurality of milking stalls.

This object is achieved by the initially mentioned control system, characterized in that the control system comprises control means able to set at least two milking stalls in the milking parlour in a pre-cleaning mode when a milking operation is still in progress in at least one of these milking stalls, wherein the local control units are arranged to prepare the milking members in said at least two milking stalls for a cleaning operation instead of a milking operation by maintaining the vacuum valve in a closed position until the cleaning operation of the milking member is started. By means of such control means, it is possible to set several milking stalls in a pre-cleaning mode at the same time. Thereafter, the operator only has to move the milking members in these milking stalls from their storage positions and put them on a respective cleaning unit before the cleaning operation starts. In order to save time, the operator may put the respective milking members on their respective cleaning unit as soon as the respective milking members have been retracted to the storage position. Thereby, the routines for a cleaning operation of the milking members in these milking stalls are significantly simplified.

The control means may comprise a computer or the like. The control means may be adapted to automatically set the milking stalls in a pre-cleaning mode at specific times, at predetermined intervals, after a specific number of milking operations etc. In many kinds of milking parlours, it is possible to perform a cleaning operation of the milking members in all milking stalls at the same time. Preferably, the control means is able to set all milking stalls in the milking parlour in a pre-cleaning mode at the same time. Alternatively, the control means is able to set a group or a row of milking stalls in a milking parlour in a pre-cleaning mode at the same time. Each local control unit may comprise a computer or the like controlling different kinds of functions in a milking stall. When the milking member is to be attached to an animal, the local control unit is arranged to open the vacuum valve, such that vacuum pressure is applied to the milking member, in order to prepare it for a milking operation. When a milking stall has been set in a pre-cleaning mode, the local control unit is instead arranged to maintain the vacuum valve in a closed position, such that no vacuum pressure is applied to the milking member, in order to prepare it for a cleaning operation. The local control unit maintains the vacuum valve in the closed position until the cleaning operation of the milking member starts.

According to an embodiment of the invention, the control means comprises a manual control member, by which it is possible for an operator to set at least two milking stalls in the milking parlour in a pre-cleaning mode. By means of such a manual control member, it is possible for an operator to set several milking stalls in a pre-cleaning mode at the same time. Thereafter, the operator only has to move the milking members in these milking stalls from their storage positions and put them on a respective cleaning unit before the cleaning operation starts. The manual control member may be mounted in a predetermined position in the milking parlour. When the milking members in the milking stalls are to be cleaned, an operator walks to the manual control member in said predetermined position and sets the milking stalls in a pre-cleaning mode by means of the manual control member. Such a manual control member may be mounted in any suitable position in the milking parlour. The operator can set the milking stalls in a pre-cleaning mode when milking operations are still in progress in the milking stalls.

According to an alternative embodiment of the invention, the manual control member is portable. In this case, the manual control member may be carried by an operator. In this case, the operator is able to set the milking stalls in a pre-cleaning mode from any position in the milking parlour. The manual control member may be connected to the local control units in the milking stalls by means of electric conduits. Alternatively, the manual control member may be wirelessly connected to the local control units in the milking stalls.

According to an alternative embodiment of the invention, the control means comprises all the local control units. It is then possible for an operator to set several milking stalls in a pre-cleaning mode at the same time by pressing a button or entering a code on any one of the local control units.

According to another embodiment of the invention, the local control unit may comprise a sensor arranged to sense when the milking member has been moved from the storage position. Such a sensor may be of an arbitrary but functional design. If the milking stall has not been set in a pre-cleaning mode, and the local control unit receives information from the sensor indicating that the milking member has been moved from the storage position, the local control unit sets the vacuum valve in an open position in order to prepare the milking member for a milking operation. The sensor may also be arranged to inform the local control unit when the milking member is back in the storage position after the milking operation. The local control unit closes the vacuum valve when it receives this information. If the milking stall has been set in a pre-cleaning mode, the control unit instead maintains the vacuum valve in the closed position until the cleaning operation of the milking system starts.

According to another embodiment of the invention, the storage device comprises a removing device adapted to detach and move the milking member from a milking animal in the milking stall to the storage position. In this case, the removing device may also be used for supporting the milking member in the storage position. Alternatively, the storage device is a separate unit in relation to the removing device. The removing device may comprise a removing unit and an elongated flexible element connected to the milking member. In this case, the milking member may hang in a storage position substantially vertically below the removing device when it is not used.

According to another embodiment of the invention, the storage device is arranged to support the milking member in two different storage positions. Thereby the storage device can support the milking member in a second storage position at a distance from the first storage position in a milking stall which has been set in a pre-cleaning mode. It is here possible for an operator to notice when a milking stall has been set in a pre-cleaning mode. Preferably, the second storage position is located closer to the cleaning unit than the first storage position. In this case, the work to move and put the milking members on the cleaning unit is further simplified.

According to another embodiment of the invention, the cleaning unit comprises several candle-shaped plugs each arranged to support a teat cup of the milking member during the cleaning operation. Such a cleaning unit provides a safe support of the teat cups during the cleaning process. The cleaning liquid is here supplied through channels in the candle-shaped plugs to the teat cups. Preferably, the milking member comprises a cluster with a claw and several teat cups connected to the claw. This kind of milking member is normally used when an operator manually attaches the milking member to the teats of a milking animal. However, it is possible to use milking members having a different design.

This object is also achieved by the initially mentioned method comprising the step of controlling the local control units to set at least two milking stalls in the milking parlour in a pre-cleaning mode when a milking operation is in progress in at least one of the milking stalls, and thereby prepare the milking members in said at least two milking stalls for a cleaning operation instead of a milking operation by maintaining the vacuum valve in a closed position until the cleaning operation of the milking member is started.

BRIEF DESCRIPTION OF THE DRAWINGS

In the following, preferred embodiments of the invention are described by examples and with references to the attached drawings, in which.

BRIEF DESCRIPTION OF PREFERRED
EMBODIMENTS OF THE INVENTION

Figure 1:
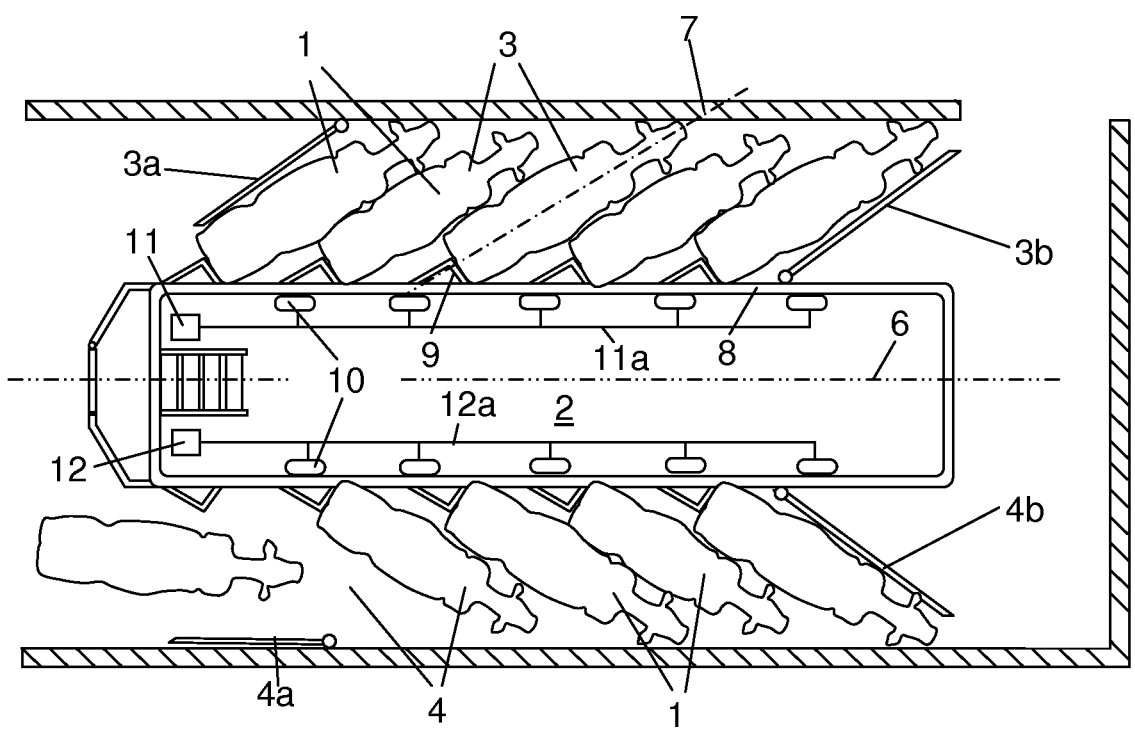
FIG. 1 shows a herringbone milking parlour provided with a plurality of milking stalls.

FIG. 1 shows a milking parlour for milking of cows 1. The milking parlour comprises an elongated pit 2 in which at least one operator works. A first group of milking stalls 3 is arranged on a first side of the pit 2 and a second group of milking stalls 4 is arranged on a second side of the pit 2. In this case, each group comprises five milking stalls 3, 4. A first entrance gate 3a to the first group of milking stalls 3 is pivotally arranged between an open position and a closed position. The first entrance gate 3a defines an inclined side wall of the first group of milking stalls 3 in a closed state. A first exit gate 3b is pivotally arranged between an open position and a closed position. The first exit gate 3b defines an inclined side wall of the first group of milking stalls 3 in a closed state. In a corresponding manner, a second entrance gate 4a and a second exit gate 4b are pivotally arranged between an open position and a closed position on the opposite side of the pit 2. The cows 1 are arranged in the milking stalls 3, 4 in a herringbone pattern. When the cows are standing in the milking stalls 3, 4, a longitudinal axis 7 through the cows forms an angle to a vertical plane 6 extending in a longitudinal direction of the elongated pit 2. However, it is also possible to arrange the milking stall in relation to the pit 2 such the longitudinal axis 7 through the cows 1 are parallel or perpendicular to said vertical plane 6. A fence arrangement 8 is arranged around the pit 2. The fence arrangement 8 prevents the cows 1 from stepping down in the pit 2.

Each milking stall 3, 4 comprises rear positioning elements in the form of rump rails 9 arranged to define the position of the rear portions of the cows 1 in the milking stalls 3, 4. Each rump rail 9 has a contact surface which is substantially perpendicular to the longitudinal axis 7 of a cow 1 standing in the milking stall 3. Each milking stall 3, 4 may comprise front positioning elements (not shown in the drawings) arranged to define the position of the front portion of the cows 1 in the milking stalls 3, 4. Such front positioning elements may be feeding troughs which move the cows 1 to a position such that the rear portions of the cows 1 come in contact with the rump rails 9. With such a positioning of a cow 1 in a milking stall 3, 4, it is easy for an operator in the pit 2 to reach the udder of the cow 1 and attach a milking member to the cow 1. Each milking stall 3, 4 comprises a milking point 10 in the form of a cabinet containing substantially all components needed for controlling the milking operations in the milking stalls 3, 4. A control system comprises control means in the form of a first manual control member 11 connected to the milking points 10 of the first row of milking stalls 3 by means of an electric conduit 11a and a second manual control member 12 connected to the milking points 10 of the second row of milking stalls 4 by means of an electric conduit 12a.

Figure 2:
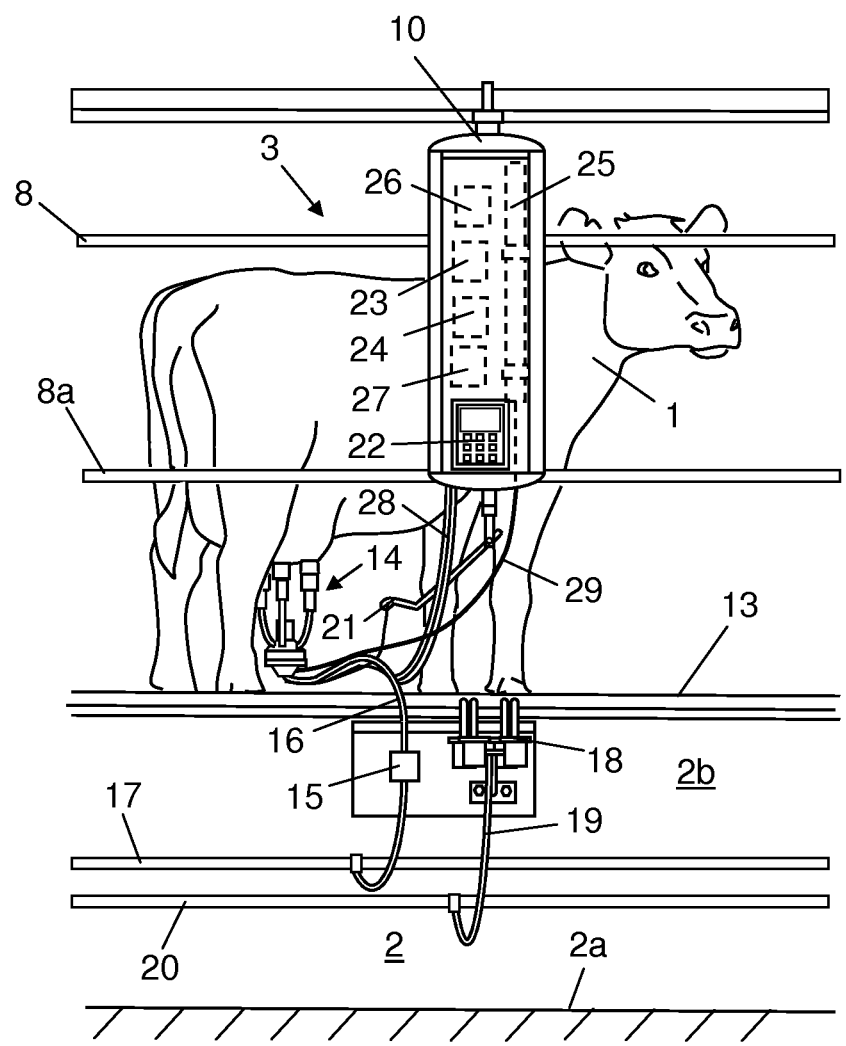
FIG. 2 shows one of the milking stalls in FIG. 1 during a milking operation and FIG. 3 shows the milking stall before a cleaning operation of a milking member is started.

FIG. 2 shows a view of one of the milking stalls 3 in FIG. 1. The milking stall 3 comprises a floor surface 13 for the cows 1 to stand on during the milking operations in the milking stalls 3. The pit 2 comprises a floor surface 2a for operators to stand on during the work in the milking parlour. The floor surface 2a of the pit 2 is located at a lower level than the floor surface 13 of the milking stalls 3. The pit 2 comprises a substantially vertical wall surface 2b connecting the floor surface 2a of the pit 2 and the floor surface 13 of the milking stall 3. The fence arrangement 8 is arranged on the floor surface 13 of the milking stall 3 in the vicinity of the vertical wall surface 2b of the pit 2. The milking stall 3 is provided with a milking member in the form of a cluster 14. The cluster 14 comprises, in known manner, a claw and four teat cups. The teat cups are connected to the claw by means of four short milk tubes and four short pulse tubes. A lower horizontal part of the fence arrangement 8a and the floor surface 13 of the milking stalls 3 define a space forming an opening to the milking stall 3 used by operators when they, for example, attach the cluster 14 to a cow 1 in the milking stall 3.

The milking stall 3 comprises a milk meter 15. The milk meter 15 is arranged to measure the milk flow from a cow 1 when it is milked in the milking stall 3. The milk meter 15 is mounted on the wall surface 2b of the pit. A long milk tube 16 conveys milk from the cluster 14 to the milk meter 15 and to a milk conduit 17. The milk conduit 17 has an extension along the wall surface 2b of the pit. The milk conduit 17 is connected to a corresponding long milk tube 16 in several milking stalls 3. A vacuum source is arranged to apply a vacuum pressure to the milk conduit 17 during the milking operations in the milking stalls 3, such that milk is sucked from the milking members 14, via the long milk tubes 16, the milk meter 15 and the milk conduit 17, to a not shown milk tank. A cleaning unit 18 is mounted on the wall surface 2b in the pit. The cleaning unit 18 may be movable between an active position and a folded away position. The cleaning unit 18 comprises four candle-shaped plugs onto which the teat cups of the cluster 14 are attached during a cleaning operation. The cleaning unit 18 is connected, via a cleaning liquid tube 19, to a cleaning liquid conduit 20 having a parallel extension with the milk conduit 17 in the pit 2. The milking stall 3 comprises further a service arm 21 arranged to hold the long milk tube 16 and the long pulse tubes 28 connected to the cluster 14 in a position above the floor surface 13 in the milking stall 3 during a milking operation.

Each milking stall 3 is equipped with a milking point 10 having a cabinet-like structure with an openable door at a front side. A local manual control member 22 for the milking point 10 is arranged on the outside of the door. The milking point 10 contains several components inside the cabinet-like structure such as a local control unit 23, a pulsator 24, a removing device 25, sensing means 26 and a vacuum valve 27. These components are schematically shown in FIG. 2. The local control unit 23 is arranged to control the pulsator 24 and thereby the vacuum pressure applied to the cluster 14 via the long pulse tube 28 during a milking operation. The removing device 25 is a cylinder provided with a movable piston connected to the cluster 14 by means of an elongated flexible element 29 such as a wire, chain, or the like.

When the cluster 14 is not used, it hangs in the flexible element 29 in a storage position below the removing device 25. The sensing means 26 is arranged to sense when the cluster 14 is moved from the storage position. The sensing means may, for example, sense the tension in the elongated flexible element 29. The sensing means 26 constitutes a component in a local control unit 23 controlling the vacuum valve 27. When a milking operation is to be performed, an operator grips the cluster 14 and lifts it to a position above the storage position. The local control unit 23 receives information from the sensing means 26 indicating that the cluster 14 has been moved from the storage position. The local control unit 23 sets the vacuum valve 27 in an open position such that a vacuum pressure is applied to the milking member 14. The milking member is thereby set in a milking mode and prepared to perform a milking operation. Furthermore, the local control unit 23 sets the removing device 25 in a mode where it is possible for the operator to pull out the cord and move the cluster 14 from the storage position to the teats of a cow 1 to be milked.

The local control unit 23 is arranged to receive information from the milk meter 15 about the milk flow during a milking operation of a cow 1 in the milking stall 3. When the milk flow drops below a predetermined minimum flow level during the main milking phase of a cow 1, this indicates that the cow 1 has been completely milked. The control unit 23 activates the removing device 25 such that it detaches the cluster 14 from the teats of the cow 1. Thereafter, the removing device 19 moves the cluster 14 back to the storage position. When the local control unit 23 receives information from the sensing means 26 that the cluster 14 has been moved back to the storage position, it sets the vacuum valve 27 in a closed position in which the vacuum pressure to the cluster 14 is shut off.

Figure 3:
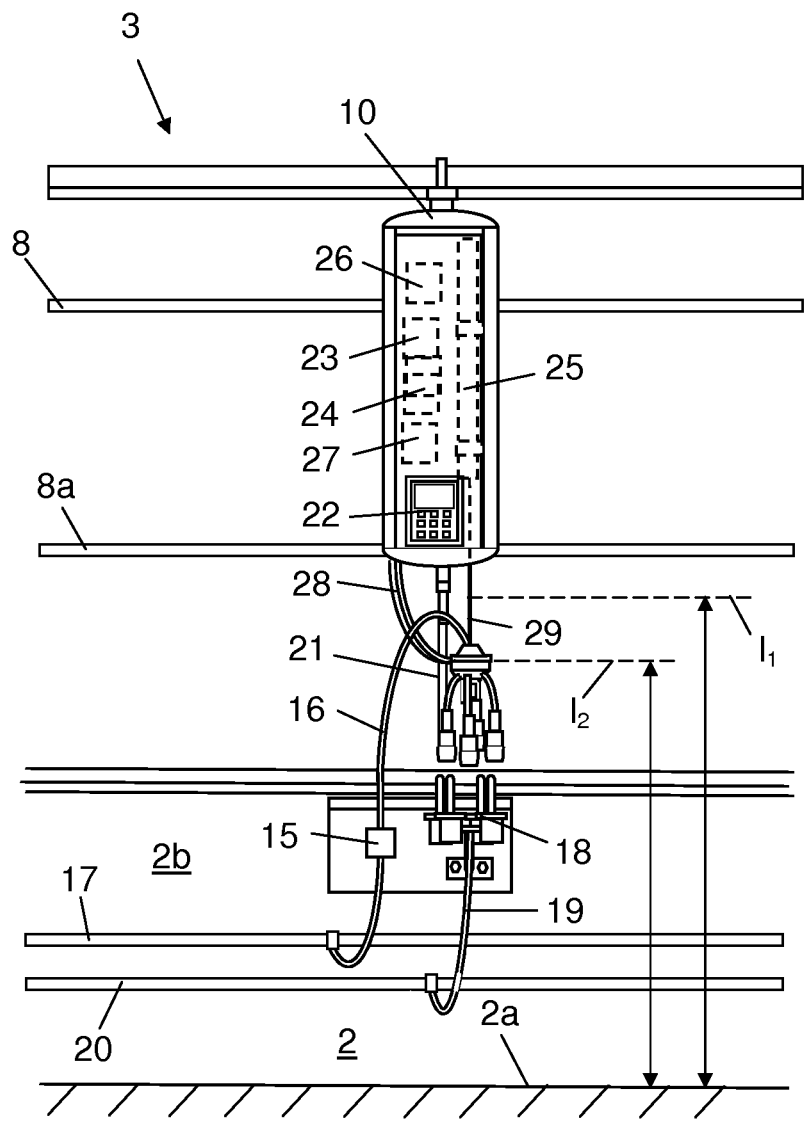

FIG. 3 shows the milking stall 3 when a cow 1 has left it after a milking operation. The cluster 14 has here been moved to the storage position by the removing device 25. FIG. 3 indicates two alternative storage positions for the cluster 14 at two different levels above the floor surface 2a in the pit. A first storage position is located at a first level $l_1$ above the floor surface 2a and a second storage position is located at a second level $l_2$ above the floor surface 2a. The cluster 14 is located closer to the cleaning unit 18 in the second storage position than in the first storage position. The cluster 14 is in said storage positions located substantially vertically above the cleaning unit 18.

When it is time for the clusters 14 in the first row of milking stalls 3 to be cleaned, an operator sets all milking stalls 3 in the first row in a pre-cleaning mode by means of the first manual control member 11 at a time when the milking operations in the milking stalls 3 are still in progress. Preferably, all milking stalls 3 are set in the pre-cleaning mode by means of a common button or similar control member. However, it is possible to have a separate button or similar for different groups of milking stalls 3 on the manual control member 11. The local control units 23 in the milking points 10 in the respective milking stall 3 receive this information from the manual control member 11. This information means that the teat cups of the cluster 14 are going to be placed on the cleaning unit 18 and not attached to a cow 1.

When a milking stall 3 has been set in a pre-cleaning mode, the local control unit 23 may control the removing device 25 such that it moves the cluster 14 to the second storage position at a lower level above the floor surface 2a in the pit than the first storage position. In this case, the cluster 14 may be placed in a storage position very close to the cleaning unit 18. The second storage position makes it easy for an operator to notice when the milking stall is set in a pre-cleaning mode. The local control unit 23 may receive information from said sensing means 26 when the cluster 14 is moved from the storage position. The local control unit 23 maintains the vacuum valve 27 in a closed position such that no vacuum pressure is applied to the cluster 14 when it is moved from the storing position. Furthermore, the local control unit 23 sets the removing device 25 in a mode where it is possible for the operator to pull out the flexible element 29 and put the teat cups of the cluster 14 on the cleaning unit 18.

When the clusters 14 in all milking stalls 3 have been attached on a respective cleaning unit 18, the operator starts the cleaning operation by means of a button or a similar component on the manual control member 11. A control signal is sent from the manual control member 11 to the local control units 23 in the respective milking stalls 3. The local control units 23 open the vacuum valves 27 in the respective milking stalls 3 such that vacuum pressure is applied to the clusters 14. Furthermore, the local control units 23 activate the pulsators 24 in the respective milking stalls 3. A cleaning liquid is supplied to the cleaning liquid conduit 20. The vacuum pressure in the milk line 17 sucks cleaning liquid from the cleaning liquid conduit 20, via the cleaning liquid tube 19, to the cleaning unit 18. The cleaning liquid is sucked through channels in the candle-shaped plugs of the cleaning unit 18 to the teat cups of the cluster 14. Thereafter, the cleaning liquid flows through the short milk tubes to the claw of the cluster 14. The cleaning liquid flows from the claw, via the long milk tube 16, to the milk conduit 17. The local control units 23 in the respective milking stalls 3 receive a control signal when the cleaning operation is to finish. The local control units 23 close the vacuum valves 27 and deactivate the pulsators 24 in the respective milking stalls 3. The local control units 23 activate the removing devices 25 such that they move the clusters 14 back to the first storage positions. The clusters 14 are now ready to be used for milking operations in the respective milking stalls 3.

When it is time for the clusters 14 in the second row of milking stalls 4 to be cleaned, an operator sets all milking stalls 4 in a pre-cleaning mode by means of the second manual control member 12. Alternatively, it is possible to use a single manual control member for setting all milking stalls 3, 4 in the milking parlour in a pre-cleaning mode. In this case, the manual control members 11, 12 are stationarily arranged in a predetermined position in the pit 2. Alternatively, the manual control members 11, 12 may be portable. Such a manual control member may be wirelessly connected to the local control units in the milking stalls.

The invention is not limited to the described embodiments but may be varied and modified freely within the scope of the claims. It is possible to use the control system according to the present invention in other kinds of milking parlours than a herringbone milking parlour. It is for example possible to use it in substantially all kinds of batch and rotary parlours and in so called midiline parlours. It is not necessary to use manual control members for setting the milking stalls in a pre-cleaning mode. The milking stalls may for example be automatically set in a pre-cleaning mode at predetermined occasions by means of a computer or the like.

The invention claimed is:

1. A control system for milking members in a milking parlour, comprising:
    a local control unit (23, 26) in each of a plurality of milking stalls (3, 4), each milking stall (3, 4) comprising
    i) a milking member (14) attachable to an animal (1) present in the milking stall (3, 4), the milking member (14) receiving a vacuum pressure based on a position of a vacuum valve (27),
    ii) a storage device (25, 29) holding the milking member (14) in a storage position when the milking member is not in use for milking the animal, and
    iii) a cleaning unit (18) arranged to clean the milking member (14),
    wherein, when the milking member (14) is moved from the storage position for a milking operation, the local control unit (23, 26) automatically prepares the milking member (14) for the milking operation by setting the vacuum valve (27) from a closed position to an open position to provide the vacuum pressure to the milking member (14); and
    a control unit (11, 12) connected to at least two of the milking stalls (3, 4) to set the at least two milking stalls (3, 4) in a pre-cleaning mode while the milking operation is in progress in at least another of the milking stalls (3, 4),
    wherein, when the at least two milking stalls (3, 4) are set in the pre-cleaning mode and the milking members (14) are then moved from the storage position, the local control unit (23, 26) of at least two milking stalls (3, 4) automatically prepares the milking members (14) of at least two milking stalls (3, 4) for a cleaning operation by maintaining the vacuum valves (27) in the closed position until the cleaning operation of the milking members (14) is started.

2. The control system according to claim 1, wherein, the control unit (11, 12) comprises a manual control member (11, 12), operable by an operator, for setting the least two milking stalls (3, 4) in the pre-cleaning mode.

3. The control system according to claim 2, wherein, the manual control member (11, 12) is mounted in a predetermined position in the milking parlour.

4. The control system according to claim 2, wherein, the manual control member (11, 12) is portable.

5. The control system according to claim 2, wherein, the manual control member (11, 12) is wirelessly connected to the local control unit (23, 26).

6. The control system according to claim 1, further comprising:
    a sensor that determines when the milking member (14) has been moved from the storage position for the milking operation,
    wherein, the local control unit (23, 26) is operatively connected to receive information from the sensor (26) when the sensor (26) determines that milking member (14) has been moved from the storage position.

7. The control system according to claim 1, wherein,
    the storage device (25, 29) comprises a removing device (25) that detaches the milking member (14) from the animal in the milking stall and then moves the milking member (14) to the storage position,
    the removing device (25) supports the detached milking member (14) in the storage position, and
    the storage position is substantially vertically below the removing device (25).

8. The control system according to claim 7, wherein,
    the storage position of the storage device (25, 29) includes a first storage position and a second storage position,
    the storage device (25, 29) is arranged to support the milking member (14) in the first storage position prior to the milking operation,
    the storage device (25, 29) is arranged to support the milking member (14), when the at least two milking stalls (3, 4) are set in the pre-cleaning mode, in the second storage position at a distance below the first storage position, and
    the second storage position is located closer to the cleaning unit (18) than the first storage position.

9. The control system according to claim 1, wherein, the cleaning unit (18) comprises plural candle-shaped plugs, each plug supporting a teat cup of the milking member (14) during the cleaning operation.

10. The control system according to claim 1, wherein, the milking member (14) comprises a cluster (14) with a claw and plural teat cups connected to the claw.

11. A method of controlling milking members in a milking parlour, comprising:
    operating a local control unit (23, 26) in each of a plurality of milking stalls (3, 4), each milking stall (3, 4) comprising i) a milking member (14) attachable to an animal (1) present in the milking stall (3, 4), the milking member (14) receiving a vacuum pressure based on a position of a vacuum valve (27), ii) a storage device (25, 29) holding the milking member (14) in a storage position when the milking member is not in use for milking the animal, and iii) a cleaning unit (18) that cleans the milking member (14);

automatically, when the milking member (14) is moved from the storage position for a milking operation, operating the local control unit (23, 26) to prepare the milking member (14) for the milking operation by setting the vacuum valve (27) from a closed position to an open position to provide the vacuum pressure to the milking member (14);

controlling a control unit (11, 12) connected to at least two of the milking stalls (3, 4) to set the at least two milking stalls (3, 4) in a pre-cleaning mode while the milking operation is in progress in at least another of the milking stalls (3, 4); and automatically, when the at least two milking stalls (3, 4) are set in the pre-cleaning mode, controlling the local control units (23, 26) of at least two milking stalls (3, 4) to prepare the milking members (14) of at least two milking stalls (3, 4) for a cleaning operation by maintaining the vacuum valves (27) in the closed position until the cleaning operation of the milking members (14) is started.

12. The method according to claim 11, wherein the control unit (11, 12) connected to the at least two of the milking stalls (3, 4) to set the at least two milking stalls (3, 4) in the pre-cleaning mode comprises a manual control member (11, 12), and the setting step is accomplished by manual operation of the manual control member.

13. The method according to claim 11, comprising the further steps of:

operating a removing device (25) to detach the milking member (14) from a milking animal in one of the milking stalls (3, 4); and with the removing device (25), supporting the detached milking member (14) in the storage position, the storage position being substantially vertically below the removing device (25).

14. The method according to claim 13, wherein, the storage position of the storage device (25, 29) is provided with a first storage position and a second storage position, the storage device (25, 29) is arranged to support the milking member (14) in the first storage position prior to the milking operation, and comprising the further step of: when the at least two milking stalls (3, 4) are set in the pre-cleaning mode, using the removing device (25) to support the milking members (14) of the at least two milking stalls in the second storage position at a distance below the first storage position, the second storage position being located closer to the cleaning unit (18) than the first storage position.

15. The method according to claim 11, comprising the further step of:

before the cleaning operation is started, putting teat cups of the milking member (14) on candle-shaped plugs of the cleaning unit (18).

* * * * *